United States Patent
Gray et al.

[11] Patent Number: 6,091,581
[45] Date of Patent: *Jul. 18, 2000

[54] THIN FILM MAGNETIC HEAD INCLUDING A SEPARATELY DEPOSITED DIAMOND-LIKE CARBON GAP STRUCTURE AND MAGNETIC CONTROL WELLS

[75] Inventors: G. Robert Gray, Fremont; Arun Malhotra, San Jose, both of Calif.

[73] Assignee: AIWA Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/795,268

[22] Filed: Feb. 10, 1997

Related U.S. Application Data

[63] Continuation-in-part of application No. 08/296,388, Aug. 26, 1994, Pat. No. 5,754,377, and a continuation-in-part of application No. 08/641,345, May 1, 1996, Pat. No. 5,748,417, which is a continuation of application No. 08/297,186, Aug. 26, 1994, abandoned.

[51] Int. Cl.⁷ .............................. G11B 5/147; G11B 5/187
[52] U.S. Cl. ............................................ 360/126; 360/122
[58] Field of Search .................................... 360/126, 125, 360/122, 119

[56] References Cited

U.S. PATENT DOCUMENTS

| | | | |
|---|---|---|---|
| 3,723,665 | 3/1973 | Lazzari et al. | 360/123 |
| 4,414,554 | 11/1983 | Springer | 360/126 |
| 4,470,051 | 9/1984 | Springer | 360/110 |
| 4,494,125 | 1/1985 | Springer | 346/74.5 |
| 4,503,439 | 3/1985 | Springer | 360/110 |
| 4,503,440 | 3/1985 | Springer | 360/110 |
| 4,517,616 | 5/1985 | Bischoff | 360/126 |

(List continued on next page.)

FOREIGN PATENT DOCUMENTS 4-182911  6/1992  Japan .

OTHER PUBLICATIONS

A. Sano, M. Egawa, M. Nitta, K. Takayanagi, T. Matsushita, and T. Fujita, A Low Inductance Metal–In–Gap Head Using a Side–Core Concept, IEEE Transactions on Magnetics, vol. 29, No. 6, pp. 3888–3890, Nov. 1993.

K.L. Mittal, Factors Affecting Adhesion of Lithographic Materials, Solid State Technology, May 1979, pp. 89–95 and 100.

J.P. Lazzari and P. Deroux–Dauphin, A New Thin Film Head Generation IC Head, IEEE Transactions on Magnetics, vol. 25, No. 5, Sep. 1989, pp. 3173–3186 and 3190–3193.

*Primary Examiner*—Craig A. Renner
*Attorney, Agent, or Firm*—Skjerven, Morrill, MacPherson, Franklin, & Friel, LLP; Ken J. Koestner

[57] ABSTRACT

A thin film magnetic head is provided in which a magnetic yoke assembly is built up, layer by layer, atop a substrate using semiconductor thin film techniques. A lower yoke assembly is first fabricated including a lower magnetic layer situated on the substrate and first and second side poles built up vertically from the ends of the lower magnetic layer. A coil structure is situated about one of the side poles and is separated therefrom by planar insulative layers in which the coil structure is disposed. An insulative pedestal surrounded by a frame is formed at the top of the lower yoke assembly and extends above the uppermost lateral plane of the yoke assembly. A diamond-like carbon (DLC) wear layer is deposited atop the pedestal. A pole well is excavated in the DLC layer so as to expose the first and second side poles therebelow. A first magnetic pole including a gap end is plated in the pole well at the top of the first side pole and extending toward the second side pole. A DLC gap region is deposited in the pole well at the gap end of the first magnetic pole. A second magnetic pole is then plated in the pole well between the second side pole and the DLC gap region. The upper surface of the head is machined to form a head surface which contacts or which nearly contacts the surface of a magnetic media.

34 Claims, 12 Drawing Sheets

U.S. PATENT DOCUMENTS

| | | | |
|---|---|---|---|
| 4,539,280 | 9/1985 | Springer | 430/39 |
| 4,544,421 | 10/1985 | Springer | 148/103 |
| 4,639,289 | 1/1987 | Lazzari | 360/123 |
| 4,731,157 | 3/1988 | Lazzari | 29/603.25 |
| 4,809,103 | 2/1989 | Lazzari | 360/126 |
| 4,837,924 | 6/1989 | Lazzari | 360/125 |
| 4,899,434 | 2/1990 | Roberts | 29/603.25 |
| 4,901,177 | 2/1990 | Lazzari | 360/113 |
| 4,912,584 | 3/1990 | Mallary et al. | 360/126 |
| 4,942,490 | 7/1990 | Lehureau | 360/126 |
| 4,949,207 | 8/1990 | Lazzari | 360/126 |
| 4,970,615 | 11/1990 | Gau | 360/126 |
| 4,984,118 | 1/1991 | Springer | 360/125 |
| 4,992,897 | 2/1991 | Deroux-Dauphin | 360/126 |
| 5,020,212 | 6/1991 | Michijima et al. | 360/127 |
| 5,041,932 | 8/1991 | Hamilton | 360/126 |
| 5,065,271 | 11/1991 | Matsuura et al. | 360/126 |
| 5,073,242 | 12/1991 | Hamilton | 204/192.22 |
| 5,090,111 | 2/1992 | Lazzari | 360/119 |
| 5,111,351 | 5/1992 | Hamilton | 360/126 |
| 5,122,917 | 6/1992 | Spainger | 360/126 |
| 5,123,156 | 6/1992 | Meunier et al. | 360/125 |
| 5,159,508 | 10/1992 | Grill et al. | 360/103 |
| 5,163,218 | 11/1992 | Hamilton | 360/122 |
| 5,166,845 | 11/1992 | Thompson et al. | 360/103 |
| 5,168,408 | 12/1992 | Lazzari | 360/113 |
| 5,189,580 | 2/1993 | Pisharody et al. | 360/126 |
| 5,195,006 | 3/1993 | Morikawa | 360/126 |
| 5,196,976 | 3/1993 | Lazzari | 360/126 |
| 5,198,948 | 3/1993 | Stover et al. | 360/126 |
| 5,202,863 | 4/1993 | Miyatake et al. | 360/103 |
| 5,208,716 | 5/1993 | Lazzari | 360/126 |
| 5,216,559 | 6/1993 | Springer | 360/106 |
| 5,224,260 | 7/1993 | Fedeli et al. | 360/127 |
| 5,260,845 | 11/1993 | Takayama et al. | 360/126 |
| 5,266,409 | 11/1993 | Schmidt et al. | 360/112 |
| 5,274,521 | 12/1993 | Miyauchi et al. | 360/126 |
| 5,384,195 | 1/1995 | Bachmann et al. | 360/122 |
| 5,396,389 | 3/1995 | Terada et al. | 360/126 |
| 5,406,695 | 4/1995 | Amemori | 360/122 |
| 5,408,373 | 4/1995 | Bajorek et al. | 360/126 |
| 5,454,158 | 10/1995 | Fontana, Jr. et al. | 360/122 |
| 5,490,028 | 2/1996 | Ang et al. | 360/126 |
| 5,563,754 | 10/1996 | Gray et al. | 360/126 |
| 5,737,825 | 4/1998 | Gray et al. | 360/126 |
| 5,754,377 | 5/1998 | Gray et al. | 360/126 |
| 5,801,909 | 9/1998 | Gray et al. | 360/126 |

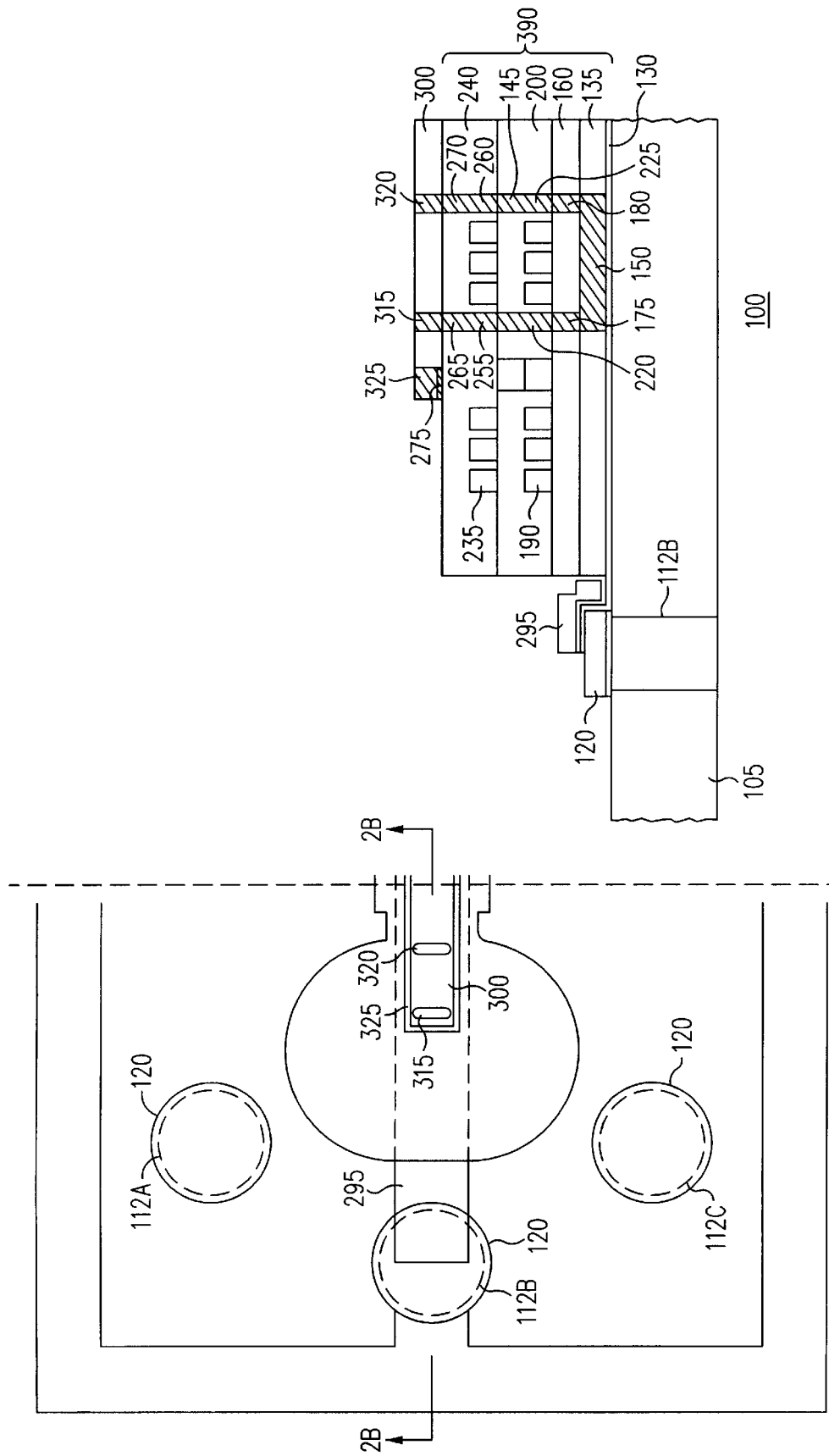

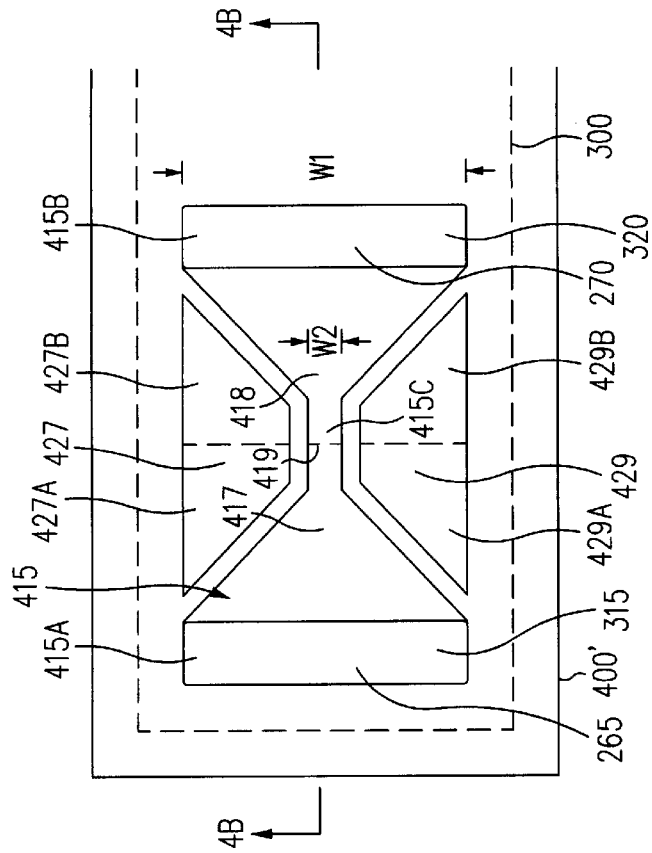
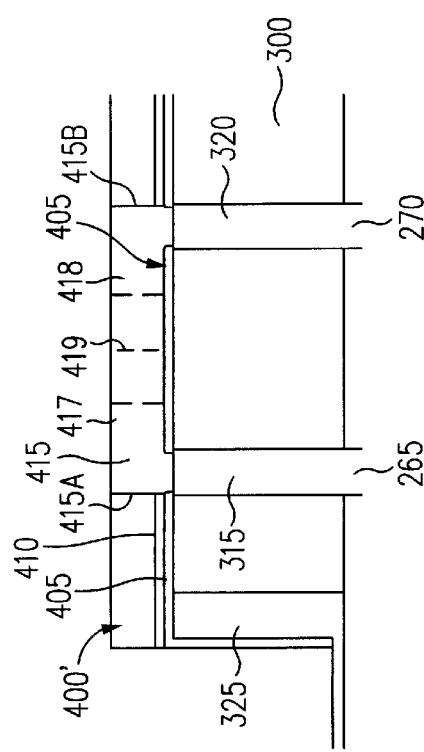
FIG. 4A
FIG. 4B

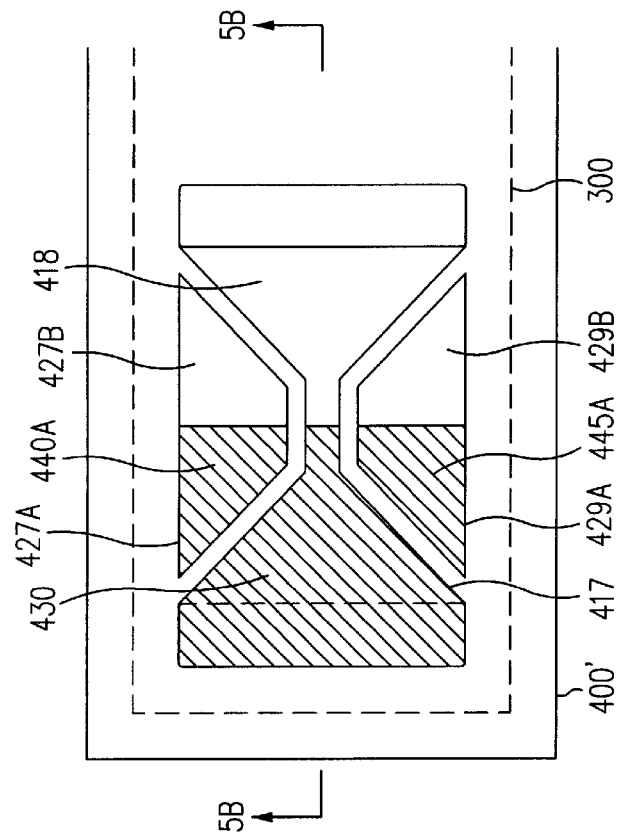
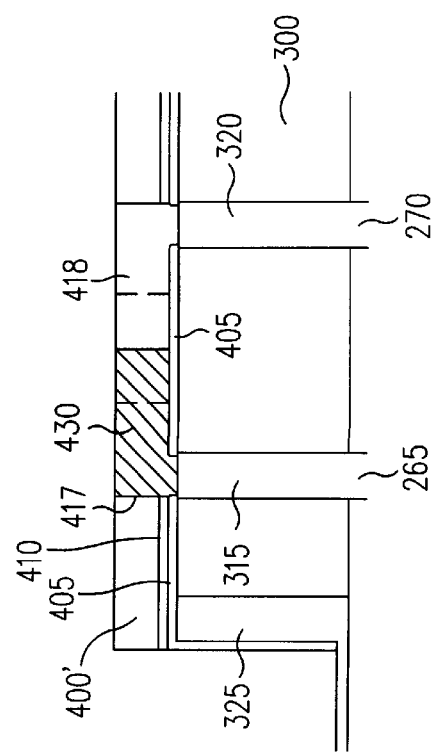
FIG. 5A
FIG. 5B

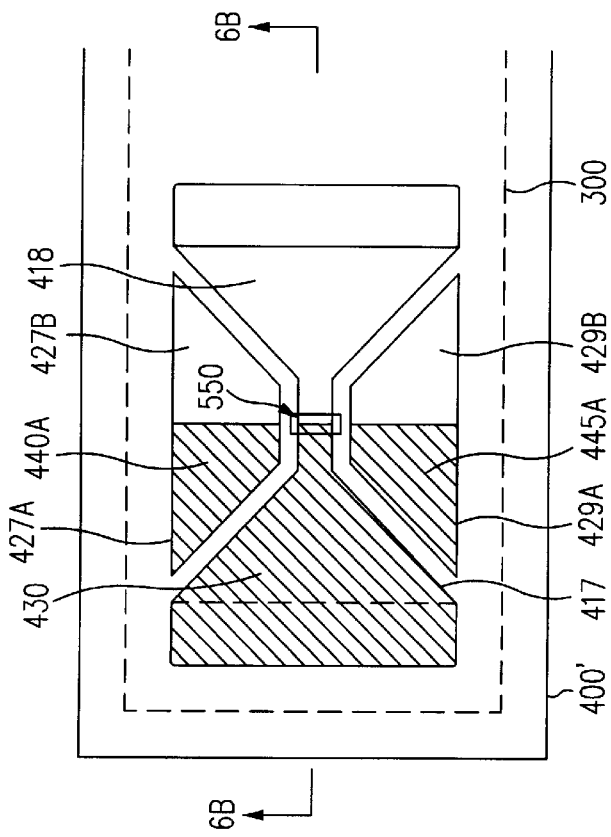
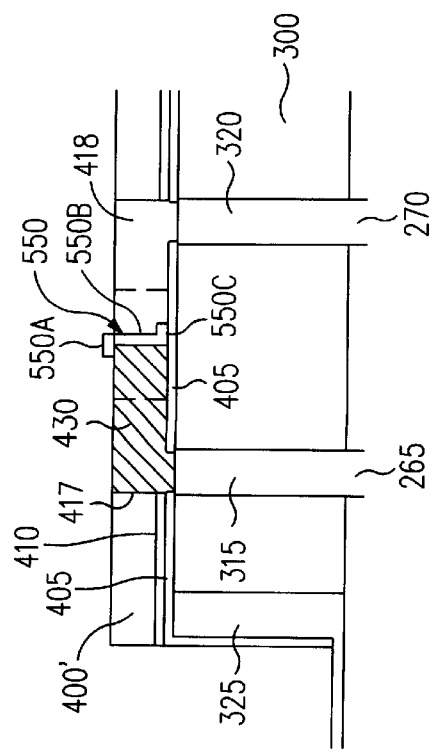

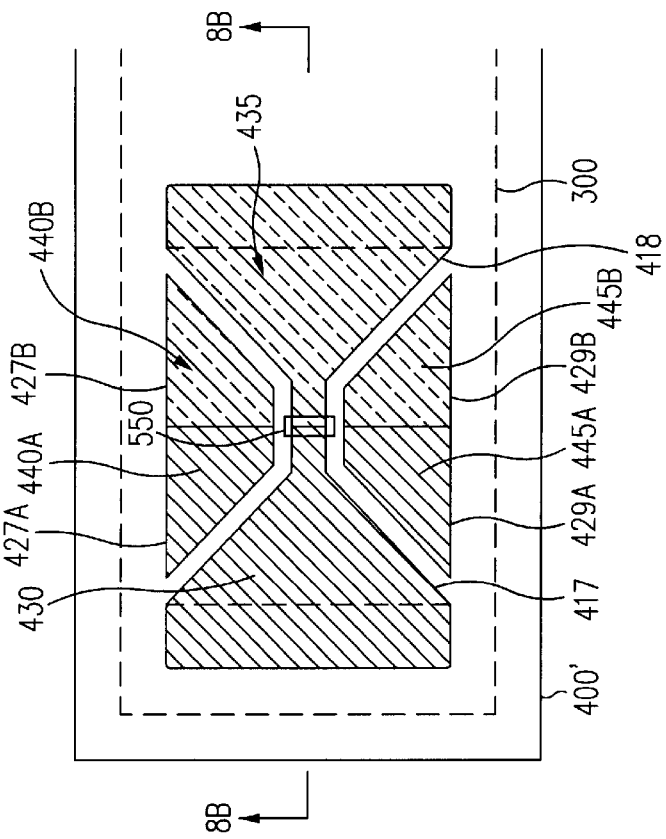
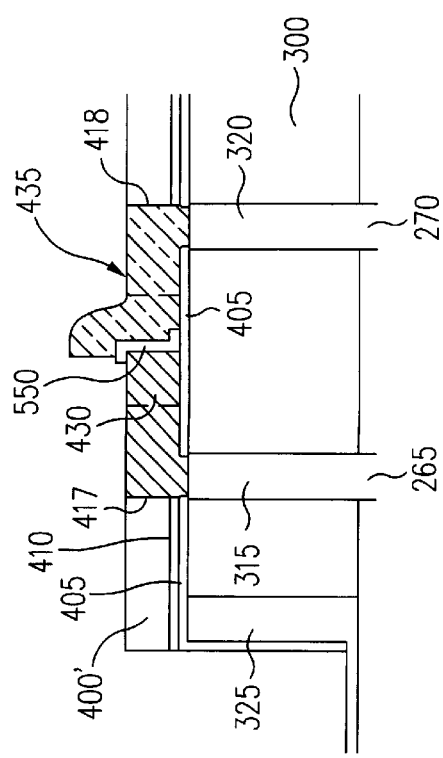
FIG. 8A
FIG. 8B

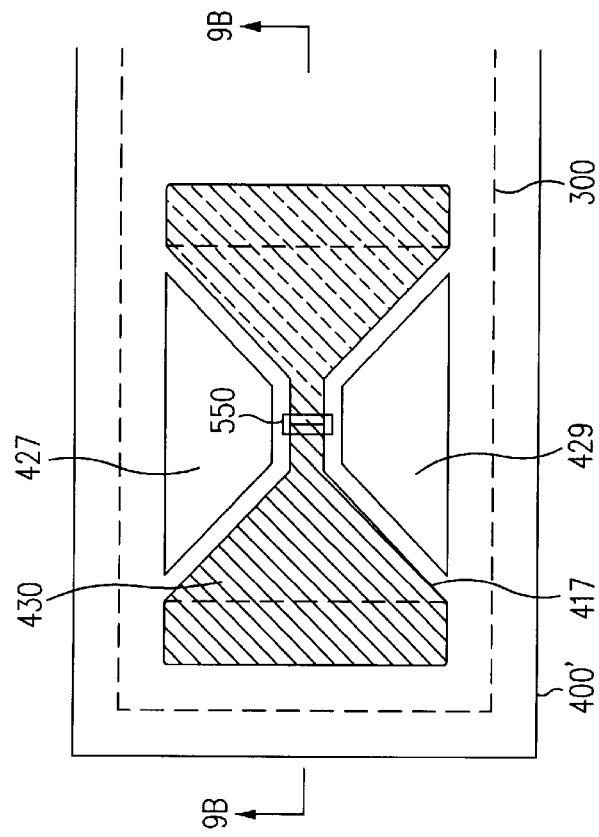
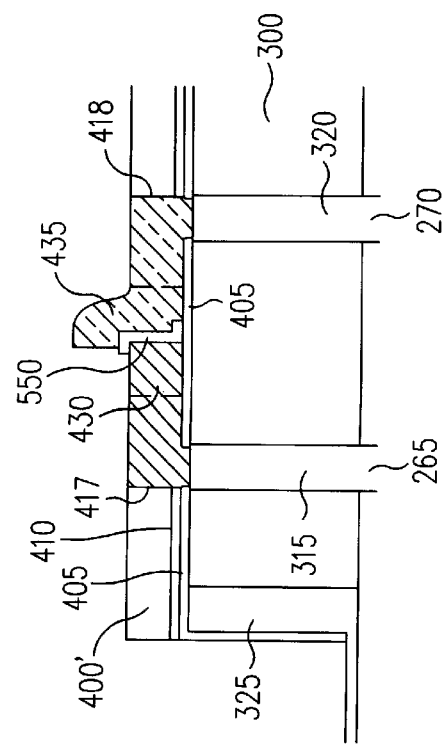
FIG. 9A
FIG. 9B

THIN FILM MAGNETIC HEAD INCLUDING A SEPARATELY DEPOSITED DIAMOND-LIKE CARBON GAP STRUCTURE AND MAGNETIC CONTROL WELLS

CROSS REFERENCE TO RELATED PATENT APPLICATIONS

This patent application is a continuation-in-part of U.S. patent application Ser. No. 08/296,388, filed Aug. 26, 1994, issued May 19, 1998 as U.S. Pat. No. 5,754,377, and is a continuation-in-part of U.S. patent application Ser. No. 08/641,345, filed May 1, 1996, issued May 5, 1998 as U.S. Pat. No. 5,748,417, which is a continuation of U.S. patent application Ser. No. 08/297,186, filed Aug. 26, 1994, now abandoned.

BACKGROUND OF THE INVENTION

1. Field of the Invention

This invention relates in general to magnetic recording and playback heads and, more particularly, to thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording medium 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

Unfortunately, thin film magnetic heads are subject to substantial wear when the head contacts magnetic recording media such as tape, for example. Over time, this wear can be very considerable and ultimately may be a cause for head failure if accumulated wear significantly damages the head.

SUMMARY OF THE INVENTION

One advantage of the thin film head of the present invention is significantly reduced head wear.

Another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

In accordance with one embodiment of the present invention, a thin film magnetic head is provided which includes a substrate and a lower pole member of magnetic material situated on the substrate and having first and second ends. The thin film head also includes first and second side pole members of magnetic material situated at the first and second ends, respectively, of the lower pole member, the first and second side pole members being built up from a plurality of layers of magnetic material deposited layer upon layer, the first and second side pole members including tops and bottoms. The head also includes an insulative body situated about the first and second side poles and built up from a plurality of layers of electrically insulative material. The head further includes a conductor coil situated within the insulative body and around one of the first and second side pole members. The thin film head includes an insulative pedestal situated at the tops of the first and second side pole members, the insulative pedestal extending above the plane of the insulative body below and surrounding the tops of the first and second side pole members. The thin film head still further includes a diamond-like carbon (DLC) layer situated on the insulative pedestal and including a pole well which is open to the tops of the first and second side pole members below. The head includes a first magnetic pole situated in the pole well, the first magnetic pole being coupled to the first side pole and extending toward the second side pole. The head also includes a second magnetic pole situated in the pole well, the second magnetic pole being coupled to the second side pole and extending toward the first side pole. The thin film head further includes a DLC gap region situated in the pole well between the first and second magnetic poles.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2A is a top plan view of one embodiment of the thin film magnetic head of the present invention prior to completion of the pole structure.

FIG. 2B is a cross-sectional view of the thin film head of FIG. 2A taking along section line 2B—2B.

FIG. 4A is a top plan view of the head of FIG. 3A after a pole well is etched in a lower DLC layer.

FIG. 4B is a cross-sectional view of the thin film head of FIG. 4A taking along section line 4B—4B.

FIG. 5A is a top plan view of the head of FIG. 4A after a first magnetic pole is deposited in the pole well.

FIG. 5B is a cross-sectional view of the thin film head of FIG. 5A taking along section line 5B—5B.

FIG. 6A is a top plan view of the head of FIG. 5A after a DLC gap region is deposited in the pole well on the head.

FIG. 6B is a cross-sectional view of the thin film head of FIG. 6A taking along section line 6B—6B.

FIG. 8A is a top plan view of the head of FIG. 7A after a second magnetic pole is deposited in the pole well.

FIG. 8B is a cross-sectional view of the thin film head of FIG. 8A taking along section line 8B—8B.

FIG. 9A is a top plan view of the head of FIG. 8A after the magnetic control regions are removed from the magnetic control wells.

FIG. 9B is a cross-sectional view of the thin film head of FIG. 9A taking along section line 9B—9B.

DETAILED DESCRIPTION OF THE INVENTION

Figure 1:
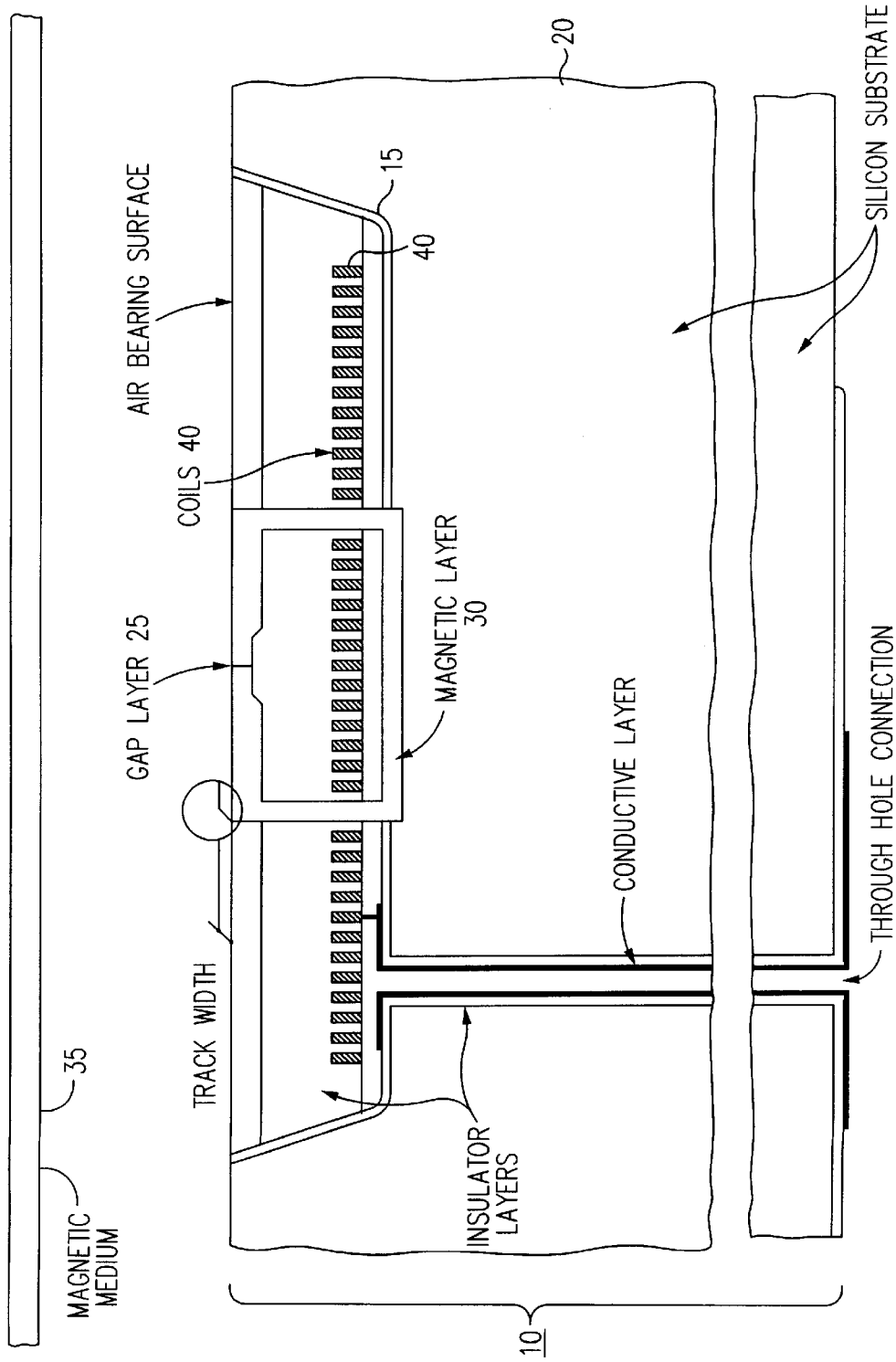
FIG. 1 is a cross section of a conventional thin film magnetic head.

FIG. 2A illustrates a top plan view of a partially complete thin film head 100 which is fabricated as described in detail in the copending patent application entitled "THIN FILM MAGNETIC HEAD INCLUDING LAYERED MAGNETIC SIDE POLES" by Arun Malhotra, Jane Ang, G. Robert Gray and James Watterston (U.S. patent application Ser. No. 08/297,186), which is incorporated herein by reference, and which is filed concurrently with this document and assigned to the same assignee, now abandoned. FIG. 2B is a cross-sectional view of head 100 taken along a section line 2B—2B.

Thin film head 100 includes an alumina substrate 105 in which via holes are formed for receiving via connective members 112A, 112B and 112C. Via connective members 112A, 112B and 112C are covered by via caps 120 which protect the via connective members from etchants used in subsequent etching steps. Via connective member 112B connects to the ground of head 100. Via connective members 112A and 112C connect to respective ends of lower coil layer 190 and upper coil layer 235.

A magnetic yoke 145 is built up, layer by layer, on a seed layer 130 of conductive material disposed on the upper surface of substrate 105. One magnetic material which may be used as material for magnetic yoke 145 is nickel-iron (NiFe). Bottom magnetic layer 150 is plated in an opening in an insulative layer 135 which is situated atop seed layer 130. First magnetic side pole 265 is built up, layer by layer, at one end of bottom magnetic layer 150 while second magnetic side pole 270 is built up, layer by layer, at the other end of bottom magnetic layer 150 as shown in FIG. 2B. More specifically, each of the magnetic layers 175, 220, 255 and 315 which together form first side pole 265 are built up in open regions in respective insulative layers 160, 200, 240 and 300. Likewise, each of the magnetic layers 180, 225, 260 and 320 which together form second pole 270 are built up in open regions in respective insulative layers 160, 200, 240 and 300. Thus, magnetic yoke 145 is formed by bottom magnetic layer 150, magnetic layers 175, 220, 255, 315 and magnetic layers 180, 225, 260 and 320, all of which are plated using common seed layer 130 as an electrode.

Magnetic yoke 145 together with insulative layers 135, 160, 200 and 240, form a main body 390 from which insulative layer 300 protrudes or extends. Insulative layer 300 thus forms a pedestal and is alternatively referred to as pedestal 300 or protrusion 300. A chrome-copper seed layer 275 is deposited on head 100 and then patterned and etched away in the area where insulative pedestal 300 is to be located as seen in FIG. 2B. Seed layer 275 acts as a seed for the subsequent plating of magnetic frame 325. One embodiment of head 100 includes a grounding strip 295 which couples via connective member 112B to magnetic yoke 145 by the electrically conductive path through seed layer 130. Grounding strip 295 and connective member 112B are omitted if grounding of head 100 is not desired for a particular application.

A frame 325 of magnetic material, for example NiFe, is patterned and plated around insulative pedestal 300 at the same time that magnetic side pole portions 315 and 320 are plated. Frame 325 exhibits a substantially rectangular shape in this particular embodiment and surrounds insulative pedestal 300 which forms the inner boundary of frame 325 as seen in FIG. 2A. Frame 325 contributes substantial structural integity to pedestal 300 and head 100.

Figure 3A:
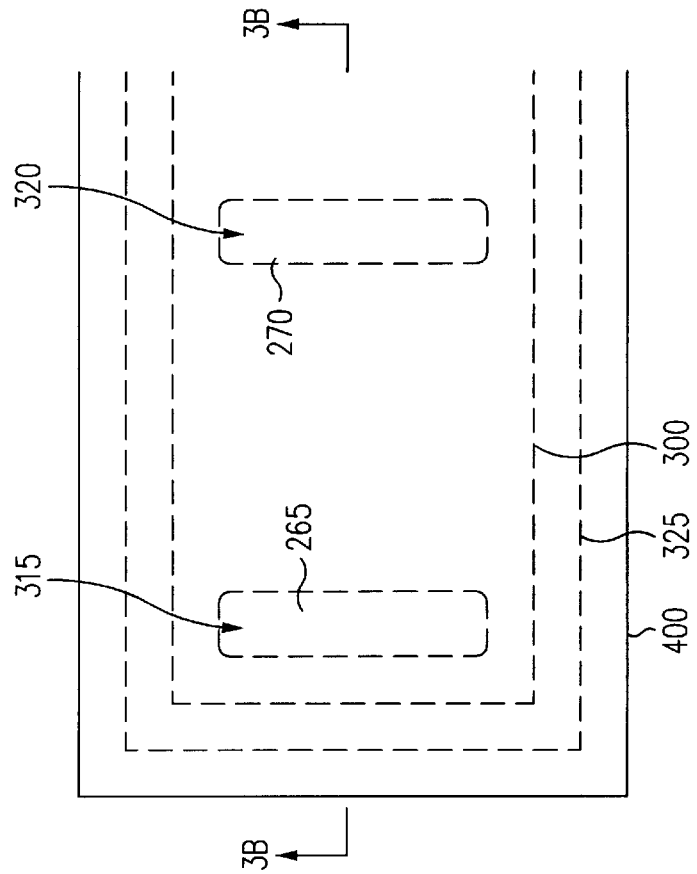
FIG. 3A is a close-up top plan view of the pole region of the thin film head of FIG. 2A after a lower diamond-like carbon (DLC) layer has been deposited on the head.

FIG. 3A is a top plan view of the side pole region of head 100 after a diamond-like carbon (DLC) wear layer 400 and associated intermediate layers are formed on the upper surface of head 100 of FIGS. 2A and 2B. Dashed lines are employed so that selected lower layers can be viewed. More particularly, magnetic side poles 315 and 320, insulative pedestal 300 and magnetic frame 325 are visible via dashed lines in FIG. 3A.

Before DLC wear layer 400 is deposited on the side pole region of head 100, the upper surface of the side pole region is prepared by sputtering a Cr—NiV seed layer 405 thereon. Seed layer 405 is patterned to include open regions above side poles 265 and 270 of magnetic yoke 145 as indicated in the cross section of head 100 shown in FIG. 3B. To actually form seed layer 405, a "lift-off" process is used. In this "lift-off" process, photoresist (not shown) is patterned covering the open regions above side poles 265 and 270 (see FIG. 3B). Seed layer 405 is then sputtered on the entire upper surface of the partially completed head 100. The photo-resist which covers open regions above side poles 265 and 270 is now "lifted-off" head 100. To accomplish this lift-off, the partially complete head 100 is placed in an ultrasonic bath including a photoresist solvent such as acetone, for example. The seed layer 405 is sufficiently thin such that it does not cover the photoresist layer at the open regions above side poles 265 and 270 very well. In this manner, there are sufficient avenues of attack by which the solvent can get through seed layer 405 at the edges of the open regions above side poles 265 and 270 to dissolve the photoresist layer at those locations. When the photoresist layer at the open regions above side poles 265 and 270 is thus dissolved, the portions of seed layer 405 immediately above the open regions above side poles 265 and 270 lift-off and float away. The region of head 100 at the open regions above side poles 265 and 270 is thus void of seed layer 405 as shown in FIG. 3B.

Figure 3B:
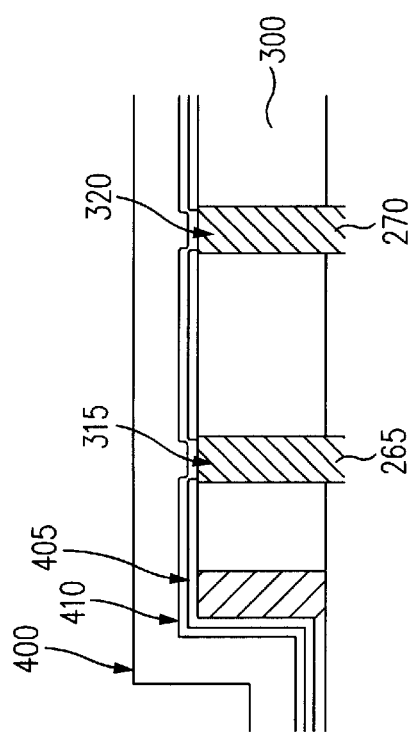
FIG. 3B is a cross-sectional view of the thin film head of FIG. 3A taking along section line 3B—3B.

A silicon adhesion layer 410 is sputtered on the exposed upper surface of head 100 as seen in FIGS. 3A and 3B. A layer of hard durable material 400 such as diamond-like carbon (DLC) is then deposited on adhesion layer 410. Adhesion layer 410 enables DLC layer 400 to stick to the upper surface of head 100. This silicon adhesion layer typically exhibits a thickness within the range of approximately 400 Å to approximately 1000 Å. This silicon adhesion layer exhibits a nominal thickness of approximately 600 Å in a preferred embodiment.

DLC layer 400 covers at least the top of magnetic yoke 145 and the immediately surrounding area of the head. As seen in FIG. 3A and more clearly in FIG. 3B, a hard protective wear layer 400 covers magnetic yoke 145 and insulative pedestal 300. Protective layer 400 exhibits a Knoop hardness greater than 700 Knoop and preferably greater than 800 Knoop. The hardness of protective layer 400 should be within the range of greater than approximately 700 Knoop to approximately 2000 Knoop. One material that is satisfactory for formation of protective wear layer 400 is diamond-like carbon (DLC).

To form such a DLC wear layer 400, DLC layer 400 is chemically vapor deposited and patterned. More specifically, both DLC layer 400 and adhesion layer 410 are reactive ion etched to leave a DLC wear layer 400' over magnetic yoke 145 and insulative pedestal 300 as shown in FIG. 4B. Prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 400 external to frame 325 is etched away and the remaining portion of DLC layer 400 is protected and remains as DLC layer 400'.

More detail is now provided with respect to the formation of DLC protective wear layer 400. Before DLC protective wear layer 400 is actually laid down on silicon adhesion layer 410, adhesion layer 410 is sputter cleaned. In the course of performing this sputter cleaning, approximately 200 Å of the upper surface of silicon adhesion layer 410 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (i.e. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20-approximately 25 mTorr at a flow rate of source material of approximately 25 cm 3/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5 m.

DLC fabricated in this manner results in a DLC layer 400 with a Knoop hardness of approximately 800. It is found that DLC layer Knoop hardnesses of greater than 700 up to approximately 2000 Knoop produce an acceptably hard wear layer 400 for wear protection purposes. DLC wear layer 400 is then reactive ion etched as described to form DLC wear layer 400'.

To recapitulate, DLC layer 400 is patterned via reactive ion etching to form a DLC frame 400' which overlies magnetic frame 325 and the side pole region therein. DLC frame 400' exhibits a substantially rectangular shape slightly larger than the substantially rectangular shape of magnetic frame 325 as seen in FIGS. 4A and 4B. DLC frame 400' is substantially vertically aligned with magnetic frame 325. DLC frame 400' may be the same size as the frame or somewhat larger.

As part of these patterning and reactive ion etching steps which form DLC frame 400', DLC layer 400 is patterned and etched to form a pole well 415 which exhibits a bow-tie like shape. Pole well 415 includes pole well end portions 415A and 415B which are significantly wider than the relatively narrow width of middle pole well portion 415C. In one particular embodiment, pole well end portions 415A and 415B exhibit a width, W1, of approximately 50 m and middle pole well portion 415C exhibits a width, W2, of approximately 14 to approximately 22 m. These dimensions will vary according to the particular application. Pole well end portion 415A opens onto the region of head 100 above side pole 265 as shown in FIG. 4B. Similarly, pole well end portion 415B opens onto the region of head 100 above side pole 270. Pole well 415 is an excavation in DLC wear layer 400' in which first and second magnetic poles will be formed.

More detail is now provided with respect to the patterning of DLC layer 400 to form DLC frame 400' which includes poles well 415 and magnetic control wells 427 and 429 therein. A relatively thin photomask layer (not shown) of metal such as chromium is sputtered over DLC layer 400. In this particular example, the metal photomask layer is approximately 500 Å thick. The metal photomask layer is photo-patterned and etched to expose DLC areas which are to be excavated by reactive ion etching. DLC layer 400 is then reactive ion etched to form DLC frame 400' which overlays magnetic frame 325 and the side pole region therein. As part of these patterning and reactive ion etching steps which form pole well 415, the portion of silicon adhesion layer 410 between side poles 265 and 270 is ion etched away to expose seed layer 405 to permit subsequent pole plating thereon. Additional magnetic control wells 427 and 429 are optionally excavated in DLC layer 400' by patterning via reactive ion etching at the same time that pole well 415 is formed.

Pole well 415 includes a well region 417 in which plating of a first magnetic pole is desired and a second well region 418 in which plating of a second magnetic pole is desired. Well regions 417 and 418 are shown separated by a dashed line 419 in FIG. 4A. Magnetic control well 427 includes magnetic control subwells 427A and 427B. Magnetic control well 429 includes magnetic control subwells 429A and 429B.

A first magnetic pole 430 is plated in well region 417 atop side pole 265 and seed layer 405 to fill well region 417 up to a level even with the top of DLC layer 400' as shown in FIGS. 5A and 5B. First magnetic pole 430 is electrically and magnetically coupled to side pole 265. More specifically, to plate first magnetic pole 430, the upper surface of head 100 of FIGS. 4A and 4B is masked off with a layer photoresist (not shown) except for well region 417. Well region 417 is then plated with magnetic material such as NiFe. First magnetic pole 430 is thus patterned and formed. Well region 418 remains unplated in this plating step because it is protected by the photoresist layer which acts as a mask. This photoresisist layer is now washed away leaving an unprotected well region 418.

It is noted that simultaneously with the above first magnetic pole plating step, magnetic control subregions 440A and 445A are plated in magnetic control subwells 427A and 429A, respectively. Magnetic control subwells 427B and 429B are masked off with photoresist (not shown) during this plating step to prevent subwells 427B and 429B from being filled with plating material. The photoresist is subsequently removed. Magnetic control subregions 440A and 445A serve to better control local plating current density which influences NiFe composition and enhances the effect of the easy axis magnetic orienting field of between approximately 1000 Gauss to approximately 10,000 Gauss, provided by an external magnet during the first magnetic pole plating step, to give a desired magnetic domain structure in the magnetic pole piece. It is noted that lower magnetic layer 150 and side poles 265, 270 are subject to the same magnetic orienting field when those structures are plated.

A layer of DLC is then deposited by chemical vapor deposition on the uppermost surfaces of the partially formed head 100, such DLC layer then being patterned and reactive ion etched to leave a DLC gap region 550 remaining as shown in FIG. 6B. In more detail, a DLC layer (not shown) is deposited by the deposition process described earlier over all the substrate or wafer on which the partially formed head 100 (and other like heads 100) are situated. This DLC layer is then masked off with photoresist so as to only expose the DLC layer at the location of gap region 550 which is shown in FIG. 6B. A DLC gap region 550 is thus formed by removal of this DLC layer except for the portion thereof in gap region 550. Reactive ion etching is used to achieve removal of the exposed portions of the DLC layer.

Figure 7A:
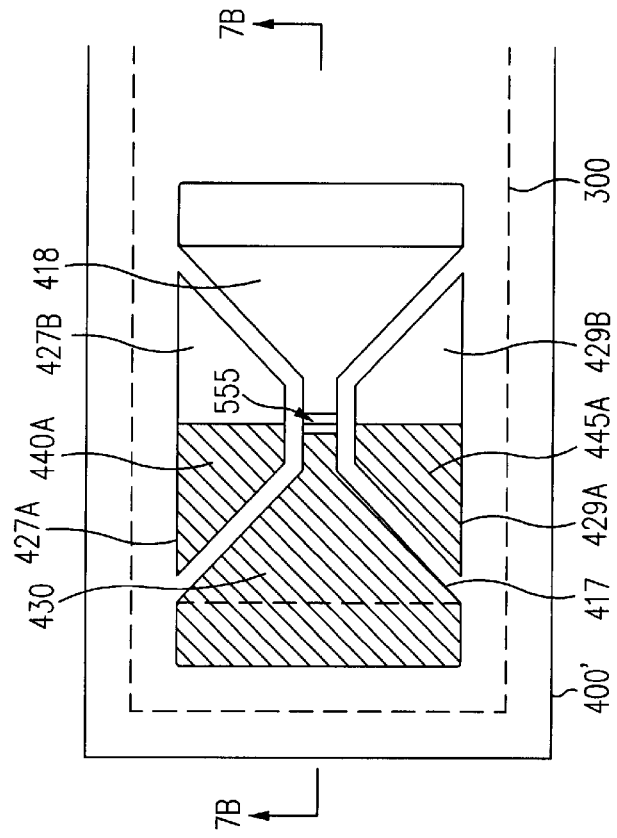
FIG. 7A is a top plan view of the head of FIG. 6A after a non-magnetic gap region is plated in the pole well on the head.
Figure 7B:
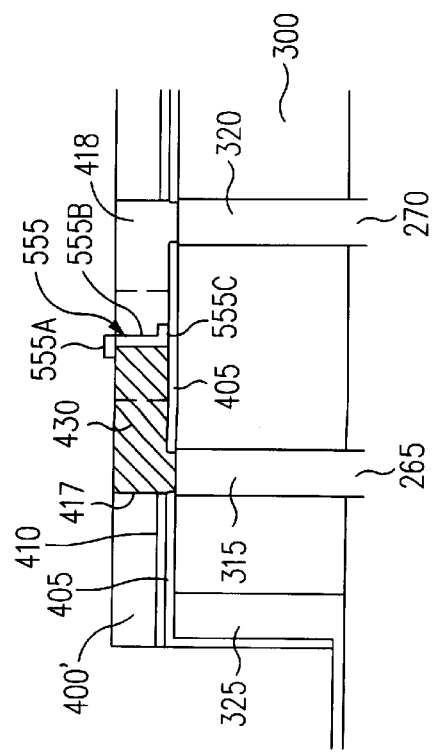
FIG. 7B is a cross-sectional view of the thin film head of FIG. 7A taking along section line 7B–6B.

In FIG. 6B, it can be seen that DLC gap region 550 includes a main gap portion 550B which is substantially normal to seed layer 405 and the substrate therebelow. Gap region 550 also includes a top portion 550A which extends from the uppermost part of main gap portion 550B and generally parallel to seed layer 405 and first magnetic pole 430. Top 550A overlies a portion of magnetic pole 430 and extends from main gap portion 550B toward side pole 265. Gap region 550 further includes a bottom portion 550C which extends from the lowermost part of main gap portion 550B and generally parallel to seed layer 405 and a second magnetic pole (not shown) which is subsequently deposited. Bottom portion 550C underlies a portion of such second magnetic pole and extends from main gap portion 550B toward side pole 270. In an alternative embodiment of the invention, rather than depositing a DLC gap region 550 as described above with reference to FIGS. 6A and 6B, a gap region 555 of a non-magnetic material such as nickel-phosphorus (NiP) is plated on seed layer 405 in place of DLC gap region 550 as shown in FIGS. 7A and 7B. The gap material plates only on the conductive surfaces and not DLC frame 400'. To prevent the gap material from being plated on head 100 at locations other than the desired gap region 555 location shown in FIG. 7A and 7B, the remainder of the head 100 other than gap region 555 is temporarily covered with a photoresist mask (not shown) during the gap plating operation. The photoresist is subsequently removed.

As seen in FIG. 7B, the gap region 555 thus formed includes a main gap portion 555B which is substantially normal to seed layer 405 and the substrate therebelow. Gap region 555 also includes a top portion 555A which extends from the uppermost part of main gap portion 555B and generally parallel to seed layer 405 and first magnetic pole 430. Top 555A overlies a portion of magnetic pole 430 and extends from main gap portion 550B toward side pole 265. Gap region 555 further includes a bottom portion 555C which extends from the lowermost part of main gap portion 555B and generally parallel to seed layer 405 and a second magnetic pole (not shown) which is subsequently deposited. Bottom portion 555C underlies a portion of such second magnetic pole and extends from main gap portion 555B toward side pole 270.

Preparations are now made for the plating of second magnetic pole 435 on seed layer 405 in well region 418. Simultaneously with this second magnetic pole plating step, magnetic control subregions 440B and 445B are plated in magnetic control subwells 427B and 429B, respectively. To implement this plating only in the areas specified above, the remaining areas of the upper surface of partially completed head 100 are covered with photoresist (not shown). NiFe plating is then conducted to form second magnetic pole 435 and magnetic control regions 440B and 445B. The photoresist is then removed leaving the pole/gap structure shown in FIGS. 8A and 8B.

Magnetic control subregions 440B and 445B serve to better control local plating current density which influences NiFe composition and enhances the effect of the easy axis magnetic orienting field of between approximately 1000 Gauss to approximately 10,000 Gauss, provided by an external magnet during the second magnetic pole plating step, to give a desired magnetic domain structure in the magnetic pole piece.

DLC frame 400' and the structures therein are patterned with photoresist to expose magnetic control subregions 427 and 429, but to protect the remaining structures on the substrate. The remainder of head 100 is also covered with photoresist. Head 100 is then subjected to an etch which removes magnetic control regions 440A, 440B, 445A and 445B from magnetic control wells 427 and 429, respectively. Magnetic control wells 427 and 429 are thus once again exposed as shown in FIG. 9A. It is noted that magnetic control well 427 is formed from magnetic control subwells 427A and 427B (shown in FIG. 8A). Similarly, magnetic control well 429 is formed from magnetic control subwells 429A and 429B.

Figure 10A:
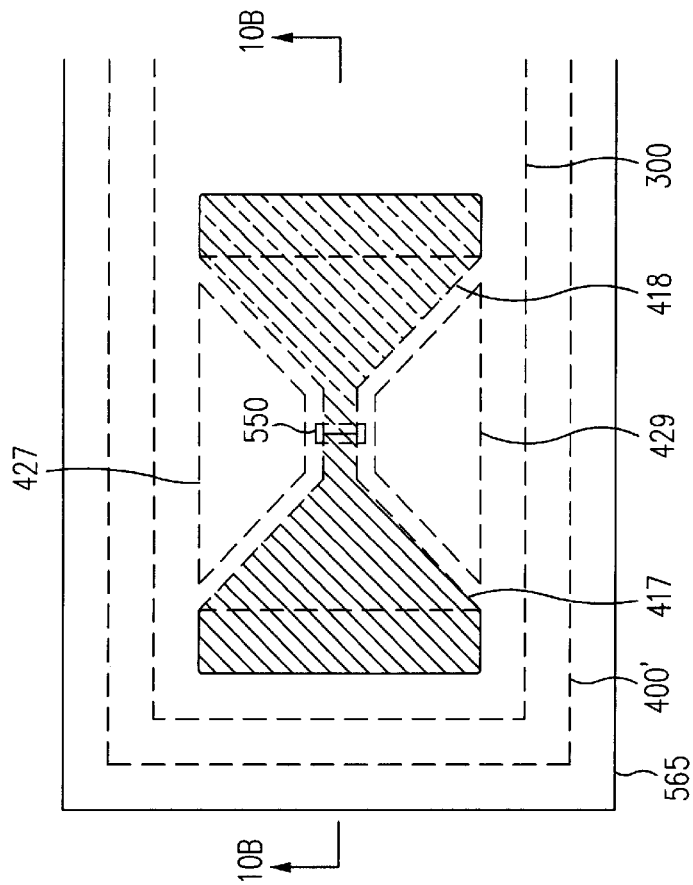
FIG. 10A is a top plan view of the head of FIG. 9A after an upper DLC layer has been deposited on the head.
Figure 10B:
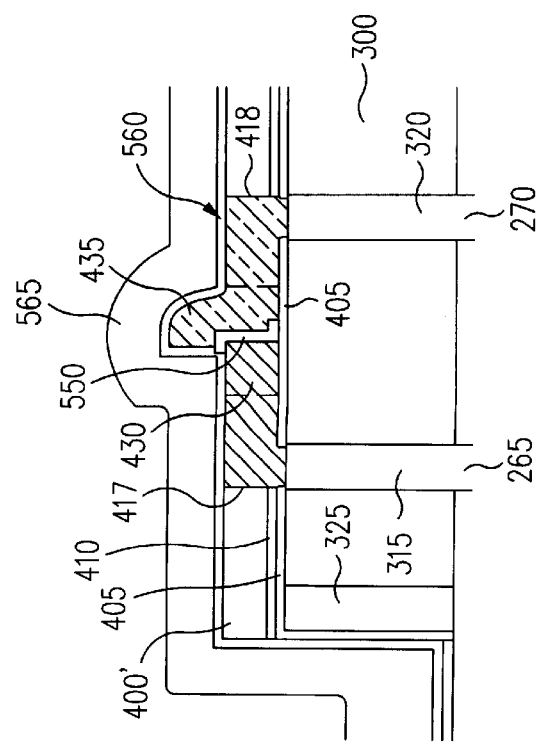
FIG. 10B is a cross-sectional view of the thin film head of FIG. 10A taking along section line 10B—10B.

A silicon adhesion layer 560 is sputtered onto the upper surface of the partially complete head 100 as shown in FIG. 10B. A DLC layer 565 is deposited by chemical vapor deposition, in a manner similar to that described earlier, onto silicon adhesion layer 560 as shown in FIGS. 10A and 10B. DLC layer 565 is deposited to a thickness equal to the depth of magnetic control wells 427 and 429 which is approximately 5 m in this particular embodiment.

Figure 11A:
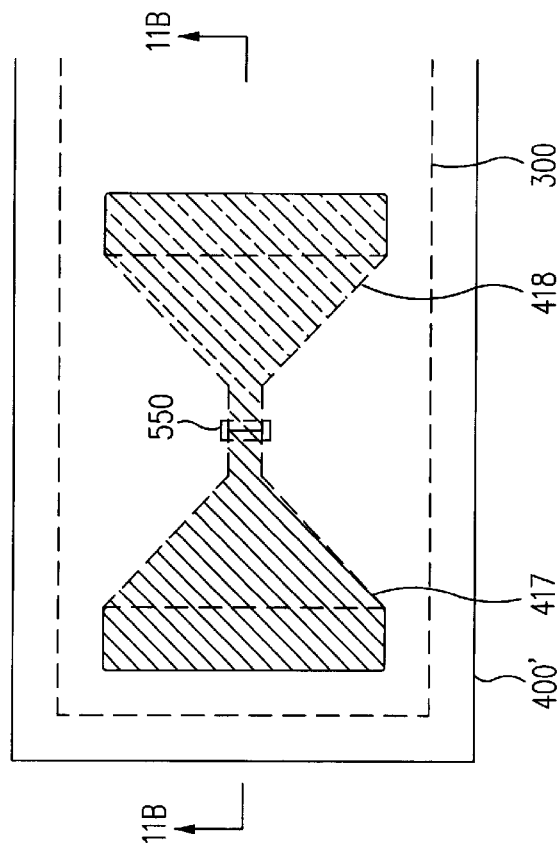
FIG. 11A is a top plan view of the head of FIG. 10A after the area of the head outside of the DLC frame is removed.
Figure 11B:
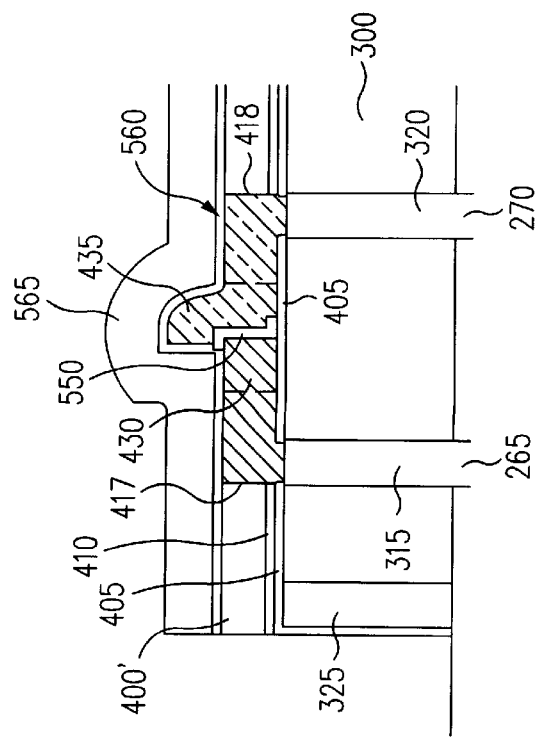
FIG. 11B is a cross-sectional view of the thin film head of FIG. 11A taking along section line 11B—11B.

A layer of photoresist (not shown) is then patterned on DLC layer 565 to protect DLC frame 400' and the structures contained therein. The exposed DLC outside of frame 400' is then reactive ion etched to remove DLC and form the structure shown in FIGS. 11A and 11B. The exposed silicon adhesion layer 560 is also removed by reactive ion etching in the formation of the structure of FIGS. 11A and 11B.

Figure 12A:
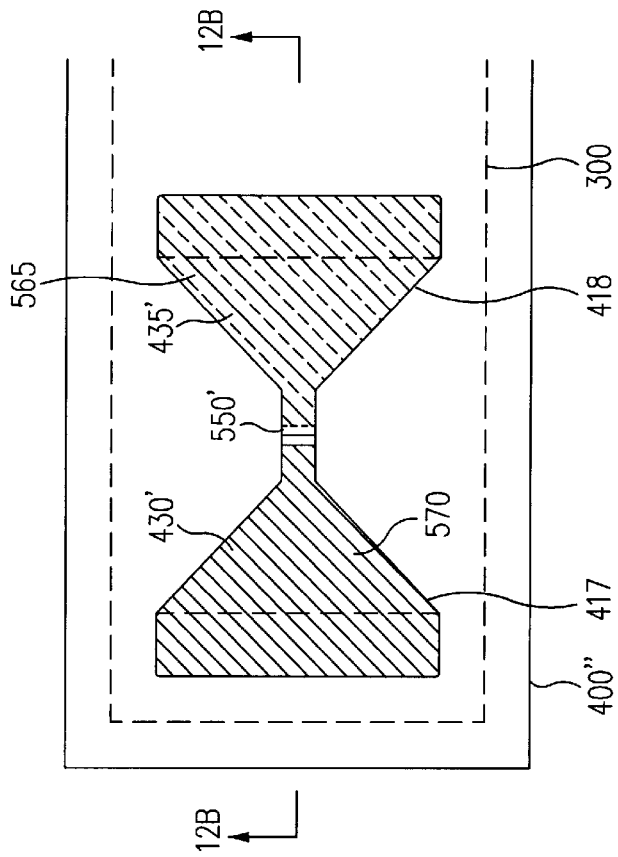
FIG. 12A is a top plan view of the head of FIG. 11A after the upper DLC layer is machined to expose the first and second magnetic poles and the DLC gap region between the poles.
Figure 12B:
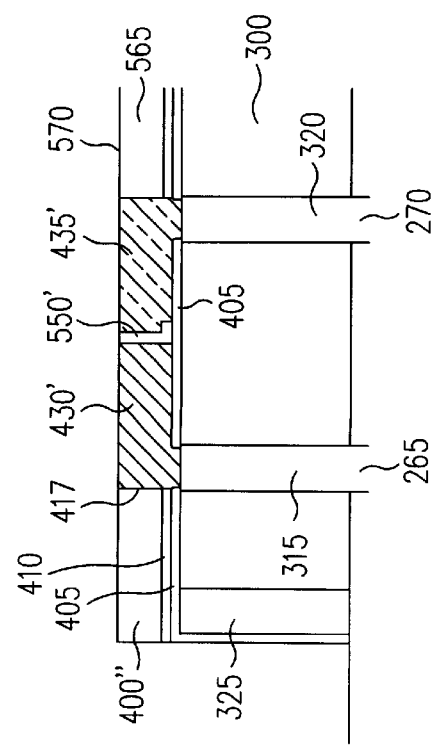
FIG. 12B is a cross-sectional view of the thin film head of FIG. 12A taking along section line 12B—12B.

DLC layer 565 is then machined down or lapped to expose poles 430, 435 and gap region 550. In one embodiment, poles 430, 435 and gap region 550 are lapped to form a substantially planar top surface 570. Poles 430' and 435' and gap region 550' are thus formed as shown in FIGS. 12A and 12B. Gap region 550' exhibits a substantially L-shaped cross section in this particular embodiment. The exposed poles 430' and 435', gap region 550' and DLC layer 400" together form the head surface 570 which is situated either touching or in close proximity with a magnetic recording medium for playback or recording purposes. In this particular embodiment, gap region 550', magnetic poles 430' and 435' and DLC frame 400" are provided with a substantially flat contour although other embodiments are possible wherein this contour is rounded or curved.

A simplified embodiment of the invention is formed when the optional additional magnetic control subregions 440A, 440B, 445A, and 445B are omitted. In this embodiment, formation of magnetic control wells 427 and 429 is omitted when pole well 415 is formed during the etching of DLC frame 400. First magnetic pole 430 and second magnetic pole 435 are plated in pole well 415 as before, However, since there are no control wells 427 and 429 which require refilling with DLC, the step of depositing an upper DLC layer 565 is omitted. The upper surface of the head 100 thus formed is still machined to shape or contour gap region 550 and magnetic poles 430 and 435. In this embodiment, gap region 550 and magnetic poles 430 and 435, and DLC frame 400 are provided with a substantially flat contour whereas other embodiments are possible wherein this contour is rounded or curved.

It is noted that magnetic poles 430 and 435 are advantageously directly coupled to side poles 265 and 270, respectively, without the use of intermediate layers therebetween in one particular embodiment. Magnetic poles 430 and 435 are simultaneously fabricated and are situated entirely in the same plane as the DLC wear layer 400' in one embodiment.

While a thin film magnetic head apparatus has been described above, it is clear that a method of fabricating such a magnetic head apparatus is also disclosed. Briefly, a method of fabricating a thin film magnetic head on a substrate is provided which includes the step of forming a lower pole member of magnetic material on the substrate, the lower pole member including first and second ends. The method also includes the step of forming first and second side pole members of magnetic material at the first and second ends, respectively, of the lower pole member, the first and second side pole members being built up from a plurality of layers of magnetic material deposited layer upon layer, the first and second side pole members including tops and bottoms. The method further includes the step of forming a conductor coil around one of the first and second side pole members while the first and second side pole members are being formed, the conductor coil being separated from the first and second side pole members by insulative layers. The method also includes the step of forming an insulative pedestal at the tops of the first and second side pole members, the insulative pedestal extending above the plane of the insulative layers below and surrounding the tops of the first and second side pole members. The method also includes the steps of depositing a first diamond-like carbon (DLC) layer on the insulative pedestal and excavating a pole well in the DLC layer to expose the tops of the first and second side pole members. The method also includes the step of forming a first magnetic pole in the pole well, the first magnetic pole being coupled to the first side pole and including a gap end extending toward the second side pole. The method further includes the step of forming a gap region in the pole well and at the gap end of the first magnetic pole. The method still further includes the step of forming a second magnetic pole in the pole well, the second magnetic pole being coupled to the second side pole and extending toward the gap end of the first magnetic pole.

The foregoing has described a thin film magnetic head in which head wear is significantly reduced. The disclosed head exhibits a narrow gap width within the range of approximately 0.2 microns to approximately 1 micron which results in correspondingly high density magnetic recording capabilities. Advantageously, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A thin film magnetic head comprising:

a substrate;

a lower pole member of magnetic material situated on the substrate and having first and second ends;

first and second side pole members of magnetic material situated at the first and second ends, respectively, of the lower pole member, the first and second side pole members being built up from a plurality of layers of magnetic material deposited layer upon layer, the first and second side pole members each having a top surface and a bottom surface;

an insulative body situated about the first and second side pole members and built up from a plurality of layers of electrically insulative material, the insulative body having a substantially planar top surface;

a conductor coil situated within the insulative body and around one of the first and second side pole members;

an insulative pedestal situated about the first and second side pole members, the insulative pedestal extending above the substantially planar top surface of the insulative body to a surface substantially planar with the top surfaces of the first and second side pole members;

a first hard protective wear layer situated on and adhered to the insulative pedestal and including a pole well opening and first and second magnetic control well openings, the pole well opening being open to the top surfaces of the first and second side pole members below, the pole well opening extending from the first side pole member to the second side pole member and the first and second magnetic control well openings being positioned lateral to the pole well opening on opposite sides of the pole well opening;

a first magnetic pole situated in a first portion of the pole well opening and exposed through the hard protective wear layer, the first magnetic pole being in direct contact with the first side pole member and extending toward the second side pole member, the first magnetic pole having a controlled magnetic domain structure and a controlled plating current density that enhances the magnetic orienting field of the first magnetic pole formed by electroplating the first magnetic pole concurrently with electroplating of a first magnetic control subregion formed in the first and second magnetic control well openings lateral and adjacent to the first magnetic pole;

a second magnetic pole situated in a second portion of the pole well opening and exposed through the hard protective wear layer, the second magnetic pole being in direct contact with the second side pole member and extending toward the first side pole member, the second magnetic pole having a controlled magnetic domain structure and a controlled plating current density that enhances the magnetic orienting field of the second magnetic pole formed by electroplating the second magnetic pole concurrently with electroplating of a second magnetic control subregion formed in the first and second magnetic control well openings lateral and adjacent to the second magnetic pole;

a second hard protective wear layer formed in the first magnetic control well opening and formed in the second magnetic control well opening, the first magnetic control well opening and the second magnetic control well opening being excavate by etching of the first magnetic control subregion and the second magnetic control subregion subsequent to electroplating of the first magnetic pole and the second magnetic pole; and a gap region of hard material situated in the pole well opening between the first and second magnetic poles, wherein the first hard protective wear layer, the first magnetic pole and the second magnetic pole exposed through the first hard protective wear layer, and the gap region in combination form a head surface for touching or being located in close proximity to a recording medium for playback or recording.

2. The magnetic head of claim 1 wherein the first hard protective wear layer has a hardness in a range from approximately 700 Knoop to approximately 2000 Knoop.

3. The magnetic head of claim 1 wherein the first hard protective wear layer has a hardness within the range of approximately 800 Knoop to approximately 2000 Knoop.

4. The thin film magnetic head of claim 1 wherein the first hard protective wear layer is diamond-like carbon (DLC).

5. The magnetic head of claim 1 wherein the gap region has a hardness in a range from approximately 700 Knoop to approximately 2000 Knoop.

6. The magnetic head of claim 1 wherein the gap region has a hardness within the range of approximately 800 Knoop to approximately 2000 Knoop.

7. The thin film magnetic head of claim 1 wherein the gap region is diamond-like carbon (DLC).

8. A thin film magnetic head comprising:

a substrate;

a lower pole member of magnetic material situated on the substrate and having first and second ends;

first and second side pole members of magnetic material situated at the first and second ends, respectively, of the lower pole member, the first and second side pole members being built up from a plurality of layers of magnetic material deposited layer upon layer, the first and second side pole members each having a top surface and a bottom surface;

an insulative body situated about the first and second side pole members and built up from a plurality of layers of electrically insulative material, the insulative body having a substantially planar top surface;

a conductor coil situated within the insulative body and around one of the first and second side pole members;

an insulative pedestal situated about the first and second side pole members, the insulative pedestal extending above the substantially planar top surface of the insulative body to a surface substantially planar with the top surfaces of the first and second side pole members;

a first diamond-like carbon (DLC) layer situated on and adhered to the insulative pedestal and including a pole well opening and first and second magnetic control well openings, the pole well opening being open to the top surfaces of the first and second side pole members below, the pole well opening extending from the first side pole member to the second side pole member and the first and second magnetic control well openings being positioned lateral to the pole well opening on opposite sides of the pole well opening;

a first magnetic pole situated in a first portion of the pole well opening and exposed through the first DLC layer, the first magnetic pole being in direct contact with the first side pole member and extending toward the second side pole member, the first magnetic pole having a controlled magnetic domain structure and controlled plating current density that enhances the magnetic orienting field of the first magnetic pole formed by electroplating the first magnetic pole concurrently with electroplating of a first magnetic control subregion formed in the first and second magnetic control well openings lateral and adjacent to the first magnetic pole;

a second magnetic pole situated in a second portion of the pole well opening and exposed through the first DLC layer, the second magnetic pole being in direct contact with the second side pole member and extending toward the first side pole member, the second magnetic pole having a controlled magnetic domain structure and controlled plating current density that enhances the magnetic orienting field of the second magnetic pole formed by electroplating the second magnetic pole concurrently with electroplating of a second magnetic control subregion formed in the first and second magnetic control well openings lateral and adjacent to the second magnetic pole;

a second DLC layer formed in the first magnetic control well opening and formed in the second magnetic control well opening the first magnetic control well opening and the second magnetic control well opening being excavated by etching of the first magnetic control subregion and the second magnetic control subregion subsequent to electroplating of the first magnetic pole and the second magnetic pole; and a DLC gap region situated in the pole well opening between the first and second magnetic poles, wherein the respective first and second DLC layers, the first magnetic pole and the second magnetic pole exposed through the respective first and second DLC layers, and the DLC gap region in combination form a head surface for touching or being located in close proximity to a recording medium for playback or recording.

9. The thin film magnetic head of claim 1 further comprising an electrically conductive seed layer situated on the insulative pedestal and below the first and second DLC layers.

10. The thin film magnetic head of claim 9 further comprising a silicon adhesion layer situated on the seed layer for enhancing the adhesion of the first and second DLC layers to the insulative pedestal.

11. The thin film magnetic head of claim 1 wherein the DLC gap region has a structure of a substantially L-shaped cross section.

12. The thin film magnetic head of claim 1 wherein the head surface for touching or being located in close proximity to the recording medium for playback or recording including the first and second DLC layers, the first magnetic pole and the second magnetic pole exposed through the respective first and second DLC layers, and the DLC gap region has a substantially flat contour.

13. The thin film magnetic head of claim 1 wherein the head surface for touching or being located in close proximity to the recording medium for playback or recording including the first and second DLC layers, the first magnetic pole and the second magnetic pole exposed through the respective first and second DLC layers, and the DLC gap region has a substantially rounded or curved contour.

14. The thin film magnetic head according to claim 1, wherein:

the first magnetic pole is electroplated concurrently with the first magnetic control subregion to control local electroplating current density, influence NiFe composition, and enhance the effect of an easy axis magnetic orienting field in a selected range from approximately 1000 Gauss to 10,000 Gauss.

15. The thin film magnetic head according to claim 14, wherein:

the second magnetic pole is electroplated concurrently with the second magnetic control subregion to control local electroplating current density, influence NiFe composition, and enhance the effect of an easy axis magnetic orienting field in a selected range from approximately 1000 Gauss to 10,000 Gauss.

16. The thin film magnetic head according to claim 1, wherein:

the second DLC layer is contiguous with the first DLC layer.

17. A magnetic read/write head apparatus comprising:

an insulative substrate;

a first seed layer disposed on the substrate;

a first pole piece including a layer of magnetically permeable material disposed on the first seed layer, the first pole piece having a generally parallel orientation with respect to the substrate;

a second pole piece integral with the first pole piece, the second pole piece having a generally normal orientation with respect to the substrate and including a plurality of integrated layers of magnetically permeable material, the second pole piece including a top;

a third pole piece integral with the first pole piece and spaced apart from the second pole piece, the third pole piece having a generally normal orientation with respect to the substrate and including a plurality of integrated layers of magnetically permeable material, the third pole piece including a top;

an insulative body disposed about the second and third pole pieces;

an insulative pedestal situated above the insulative body and through which the tops of the second and third pole pieces extend;

a second seed layer disposed on the insulative pedestal between the second and third pole pieces, the second seed layer having first and second portions;

a diamond-like carbon (DLC) frame situated atop the insulative pedestal and including a pole well opening and first and second magnetic control well openings, wherein the pole well opening opens onto the second seed layer and the tops of the second and third pole pieces, the pole well opening extending from the first side pole member to the second side pole member and the first and second magnetic control well openings being positioned lateral to the pole well opening on opposite sides of the pole well opening;

a fourth pole piece exposed through the DLC frame and including a layer of magnetically permeable material integral with and in direct contact with the second pole piece and disposed in a first portion of the pole well opening on the first portion of the second seed layer, the fourth pole piece having a controlled magnetic domain structure and controlled plating current density that enhances the magnetic orienting field of the fourth pole piece formed by electroplating the fourth pole piece concurrently with electroplating of a first magnetic control subregion formed in the first and second magnetic control well openings lateral and adjacent to the fourth pole piece;

a fifth pole piece exposed through the DLC frame and including a layer of magnetically permeable material integral with and in direct contact with the third pole piece and disposed in a second portion of the pole well opening on the second portion of the second seed layer, the fifth pole piece having a controlled magnetic domain structure and controlled plating current density that enhances the magnetic orienting field of the fifth pole piece formed by electroplating the fifth pole piece concurrently with electroplating of a second magnetic control subregion formed in the first and second magnetic control well openings lateral and adjacent to the fifth pole piece;

a DLC pocket layer formed in the first magnetic control well opening and formed in the second magnetic control well opening, the first magnetic control well opening and the second magnetic control well opening being formed by removing the first and second magnetic control subregions subsequent to electroplating of the fourth pole piece and the fifth pole piece;

a DLC gap region situated in the pole well opening between the fourth and fifth pole pieces, the gap region having a generally normal orientation with respect to the substrate, wherein the DLC frame, the fourth pole piece and the fifth pole piece exposed through the DLC frame, and the DLC gap region in combination form a head surface for touching or being located in close proximity to a recording medium for playback or recording; and a coil structure formed around one of the third and fourth pole pieces.

18. The head apparatus of claim 17 wherein the DLC gap region is substantially L-shaped in cross section.

19. The head apparatus of claim 17 further comprising an adhesion layer situated between the pedestal and the DLC frame.

20. The head apparatus of claim 17 wherein the DLC frame has a structure of a substantially rectangular geometry.

21. The magnetic read/write head apparatus of claim 17 wherein the head surface for touching or being located in close proximity to the recording medium for playback or recording including the DLC frame, the fourth pole piece and the fifth pole piece exposed through the DLC frame, and the DLC gap region has a substantially flat contour.

22. The magnetic read/write head apparatus of claim 17 wherein the head surface for touching or being located in close proximity to the recording medium for playback or recording including the DLC frame, the fourth pole piece and the fifth pole piece exposed through the DLC frame, and the DLC gap region has a substantially rounded or curved contour.

23. The magnetic read/write head apparatus according to claim 17, wherein:

the fourth pole piece is electroplated concurrently with the first magnetic control subregion to control local electroplating current density, influence NiFe composition, and enhance the effect of an easy axis magnetic orienting field in a selected range from approximately 1000 Gauss to 10,000 Gauss.

24. The magnetic read/write head apparatus according to claim 23, wherein:

the fifth pole piece is electroplated concurrently with the second magnetic control subregion to control local electroplating current density, influence NiFe composition, and enhance the effect of an easy axis magnetic orienting field in a selected range from approximately 1000 Gauss to 10,000 Gauss.

25. The magnetic read/write head apparatus according to claim 17, wherein:

the DLC pocket layer is contiguous with the DLC frame.

26. A magnetic read/write head apparatus comprising:

an insulative substrate;

a first seed layer disposed on the substrate;

a first pole piece including a layer of magnetically permeable material disposed on the first seed layer, the first pole piece having a generally parallel orientation with respect to the substrate;

a second pole piece integral with the first pole piece, the second pole piece having a generally normal orientation with respect to the substrate and including a plurality of integrated layers of magnetically permeable material, the second pole piece including a top;

a third pole piece integral with the first pole piece and spaced apart from the second pole piece, the third pole piece having a generally normal orientation with respect to the substrate and including a plurality of integrated layers of magnetically permeable material, the third pole piece including a top;

an insulative body disposed about the second and third pole pieces;

an insulative pedestal situated above the insulative body and through which the tops of the second and third pole pieces extend;

a second seed layer disposed on the insulative pedestal between the second and third pole pieces, the second seed layer having first and second portions;

a diamond-like carbon (DLC) frame situated atop the insulative pedestal and including a pole well opening and first and second magnetic control well openings wherein the pole well opening opens onto the second seed layer and the tops of the second and third pole pieces, the pole well opening extending from the first side pole member to the second side pole member and the first and second magnetic control well openings being positioned lateral to the pole well opening on opposite sides of the pole well opening;

a fourth pole piece exposed through the DLC frame and including a layer of magnetically permeable material integral with and in direct contact with the second pole piece and disposed in a first portion of the pole well opening on the first portion of the second seed layer, the fourth pole piece having a controlled magnetic domain structure and controlled plating current density that enhances the magnetic orienting field of the fourth pole piece formed by electroplating the fourth pole piece concurrently with electroplating of a first magnetic control subregion formed in the first and second magnetic control well openings lateral and adjacent to the fourth pole piece;

a fifth pole piece exposed through the DLC frame and including a layer of magnetically permeable material integral with and in direct contact with the third pole piece and disposed in a second portion of the pole well opening on the second portion of the second seed layer, the fifth pole piece having a controlled magnetic domain structure and controlled plating current density that enhances the magnetic orienting field of the fifth pole piece formed by electroplating the fifth pole piece concurrently with electroplating of a second magnetic control subregion formed in the first and second magnetic control well openings lateral and adjacent to the fifth pole piece;

a DLC pocket layer formed in the first magnetic control well opening and formed in the second magnetic control well opening, the first magnetic control well opening and the second magnetic control well opening being formed by removing the first magnetic control subregion and the second magnetic control subregion subsequent to electroplating of the fourth pole piece and the fifth pole piece;

a non-magnetic gap region situated in the pole well opening between the fourth and fifth pole pieces, the gap region having a generally normal orientation with respect to the substrate, wherein the DLC frame, the fourth pole piece and the fifth pole piece exposed through the DLC frame, and the non-magnetic gap region in combination form a head surface for touching or being located in close proximity to a recording medium for playback or recording; and a coil structure formed around one of the third and fourth pole pieces.

27. The head apparatus of claim 26 wherein the non-magnetic gap region is substantially L-shaped in cross section.

28. The head apparatus of claim 26 further comprising an adhesion layer situated between the pedestal and the DLC frame.

29. The head apparatus of claim 26 wherein the DLC frame has a structure of a substantially rectangular geometry.

30. The magnetic read/write head apparatus of claim 26 wherein the head surface for touching or being located in close proximity to the recording medium for playback or recording including the DLC frame, the fourth pole piece and the fifth pole piece exposed through the DLC frame, and the non-magnetic gap region has a substantially flat contour.

31. The magnetic read/write head apparatus of claim 26 wherein the head surface for touching or being located in close proximity to the recording medium for playback or recording including the DLC frame, the fourth pole piece and the fifth pole piece exposed through the DLC frame, and the non-magnetic gap region has a substantially rounded or curved contour.

32. The magnetic read/write head apparatus according to claim 26, wherein:

the fourth pole piece is electroplated concurrently with the first magnetic control subregion to control local electroplating current density, influence NiFe composition, and enhance the effect of an easy axis magnetic orienting field in a selected range from approximately 1000 Gauss to 10,000 Gauss.

33. The magnetic read/write head apparatus according to claim 32, wherein:

the fifth pole piece is electroplated concurrently with the second magnetic control subregion to control local electroplating current density, influence NiFe composition, and enhance the effect of an easy axis magnetic orienting field in a selected range from approximately 1000 Gauss to 10,000 Gauss.

34. The magnetic read/write head apparatus according to claim 26, wherein:

the DLC pocket layer is contiguous with the DLC frame.

* * * * *